Nov. 7, 1961  A. P. GROVER  3,007,197
APPARATUS FOR MOLDING ARTICLES FROM SLUGS OF HEAT-CURABLE MATERIAL
Filed Nov. 21, 1957  7 Sheets-Sheet 1

INVENTOR.
Anthony P. Grover
BY
Johnson and Kline
ATTORNEYS

Fig. 9

United States Patent Office 3,007,197
Patented Nov. 7, 1961

3,007,197
APPARATUS FOR MOLDING ARTICLES FROM SLUGS OF HEAT-CURABLE MATERIAL
Anthony P. Grover, Willoughby, Ohio, assignor to The Eagle-Picher Company, Cincinnati, Ohio, a corporation of Ohio
Filed Nov. 21, 1957, Ser. No. 697,903
9 Claims. (Cl. 18—5)

This invention relates to apparatus for molding articles from a thermoplastic heat-curable material as exemplified by an elastomeric material such as rubber.

More specifically this relates to a molding machine which has a series of article-forming molding units moving in a predetermined endless path. From a feeding station the material is placed sequentially into the molding units each of which has a pair of cooperative forming dies constituting a molding cavity. These units then pass through a period of semi-curing by heat supplied to the forming dies along the path with the article remaining confined in the cavity formed by the closed dies, to set the material so the formed article will retain its shape after release from the dies. The articles are released by the opening of the dies at a discharge station guiding the articles away from the machine to a finish-curing operation if necessary.

This invention is an improvement in a continuous molding machine to overcome certain drawbacks that are inherent in continuous strip feeding of the molding material to the molding units, where the strip of molding material joins the path of the forming units tangentially so that each unit will produce the article from the strip by a combined blanking and forming operation. The continuous strip feed has been practical and successful in spite of limitations such as those due to the difficulties arising when attempting to form bulkier or more complex shapes from the strip especially where the article requires relatively deep molding cavities, or due to limitations in the flowability of the material being forced to fill the cavity of the molds, or because of the vulnerability of the uncured material of the strip being subject to possible breaking.

This invention proposes to avoid and eliminate the above problems of the strip feeding method, and has for its object to automatically supply molding material to the molding units in the form of slugs to supply the quantity of material according to the shape and volume of the article to be molded.

Hence the invention provides a continuous molding machine with a slug feeding mechanism, the operation of which is timed and governed by the movement of the molding units along their path in such a manner as to place a slug into each molding unit as it passes a feeding station.

The invention also provide a slug supply mechanism whereby the slugs are cut as needed from a continuous strand of molding material being fed to the mechanism. The strand is of a cross-section suited to the purpose of the article to be formed from the slugs. The mechanism therefore includes means for step-wise feeding of the strand to the associated cutting devices whereby a desired length constituting the slug is cut from the strand as needed for each molding operation and delivered to each of the respective forming units as they move past the feeding station of the mechanism.

In one form of the invention the molding machine has the series of molding units mounted upon a rotary mold carrier so they will move in an endless cyclic path with the forming dies movable to open and close coaxially in respect to one another.

The slug feeding mechanism, according to this invention, may be centrally controlled by or geared to the movement of the mold carrier to be effective to position a slug between the open forming dies as the units move past the slug feeding station. The slugs thus positioned are received and held by the forming dies at which time the slug becomes detached from its feed means, so that the forming dies may then be fully closed upon the slug as well as upon each other to form the article which is accomplished as the molding units continue along their path.

In the embodiment illustrated herein as exemplary thereof, a strand feeding mechanism drawing the strand from a supply station, advances the strand step by step to a slug cutting device. Each slug thus produced is conveyed to a slug catching detent device controlled to release one slug at a time into one of a series of pockets provided on a rotary slug transfer member and traveling past the detent device, so that the positioning member may pick up one slug at a time from a respective pocket for placing in a molding unit. The positioning member may be in the form of a disc having a knife edge which partially penetrates into the body of the slugs between its ends sufficient to cause the slug to adhere to it and be taken from the pockets of the transfer member and carried to the molding units as the positioning member and the transfer member rotate in coordination with the travel of the die-carrying wheel.

Still other features lie in the provision of a pneumatic system for actuating those component devices of the mechanism such as the strand advancing and slug cutting means, which require intermittent or step-by-step operation centrally controlled and timed by the rate of movement of the molding units in thir cyclic path.

Other features and advantages will hereinafter appear.

Figure 1:
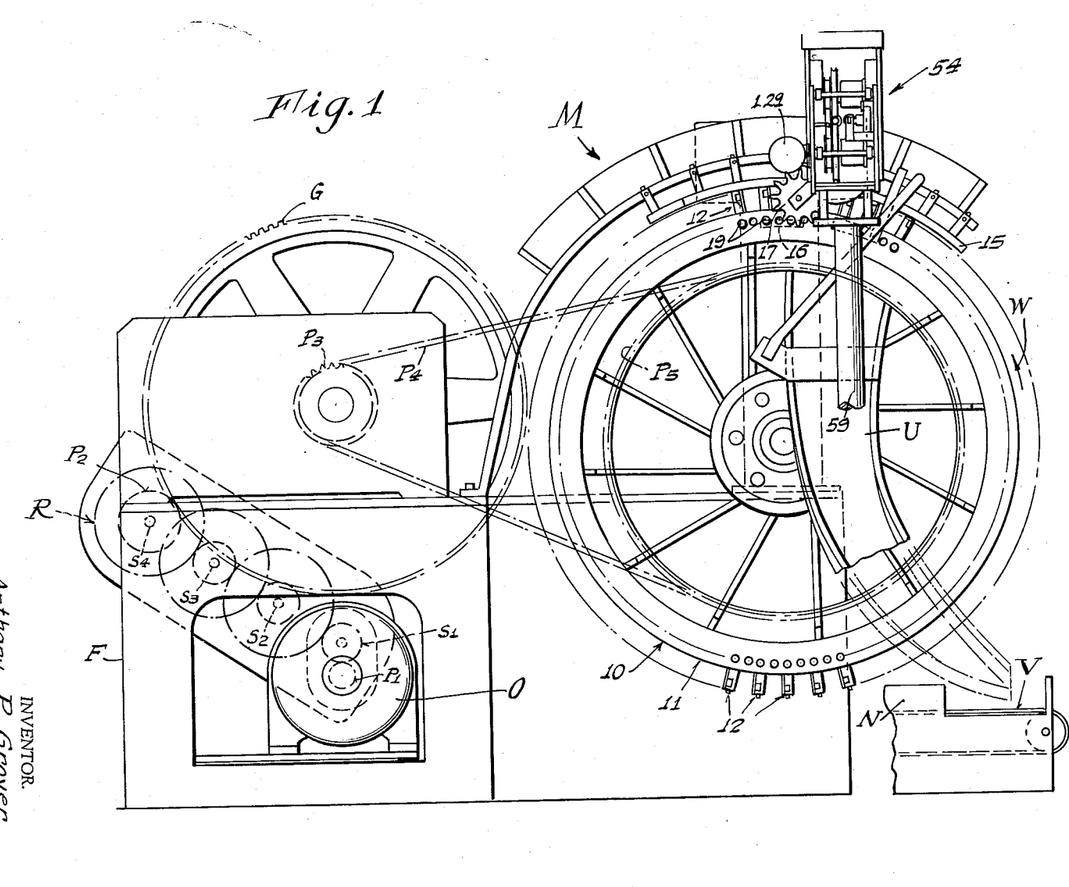
FIGURE 1 is a view of a continuous molding machine having a rotary carrier for the molding units in combination with the slug feeding mechanism.

Referring to the accompanying drawings, a slug feeding mechanism exemplary of this invention is herein shown in combination with a continuous molding machine M. The example of a molding machine herein shown has a rotary mold carrier 10 with a horizontal axis of rotation, driven from a motor O through a train R of reduction gears mounted on respective countershafts $s_1$, $s_2$, $s_3$, $s_4$ journaled in a base or frame F. An input pinion $P_1$ is mounted on the motor shaft while an output pinion $P_2$ is mounted on the countershaft $s_4$ driving a large gear G. Output sprocket $P_3$ rotating with the large gear G drives the rotary mold carrier 10 through an endless chain $P_4$ engaging a larger sprocket $P_5$ coaxial and fixed to the rotary carrier 10. The mold carrier 10 also journaled on base F has a peripheral rim or drum portion 11 along which are mounted a series of molding units 12 each of which has a pair of cooperative coaxially movable molding dies 13 and 14. In this embodiment, the die 14 has an axially movable core member 14a for making and ejecting annular molded articles, more fully described in connection with FIG. 10 below.

For the purpose of this invention the molding units 12 are equipped to receive slugs of molding material where previously a continuous strip of the molding material was fed to the traveling forming dies with the strip tangentially joining the cyclic path of the molding units 12. The present embodiment of a molding unit has provision for a pair of molding dies to be moved toward each other in an initial closing operation effective to engage a slug K after it has been positioned between the dies. Slug positioning means according to the present embodiment will release the slug thus positioned after it has been received by the forming dies, whereupon the dies are fully closed upon each other and upon the slug forcing the molding material to fill the cavity of the dies. The closed molding units with the article confined therein then proceed along their cyclic path incident to the rotation of the carrier in the direction of arrow W while undergoing a period of semi-curing by heat supplied to the forming dies in any suitable manner known. At the end of the semi-curing period as the units again approach the zenith of their cyclic path, the molding dies are opened to release the semi-cured article therefrom through a discharge chute U onto a conveyor V carrying the articles into and through a curing station such as a curing oven N.

Figure 5:
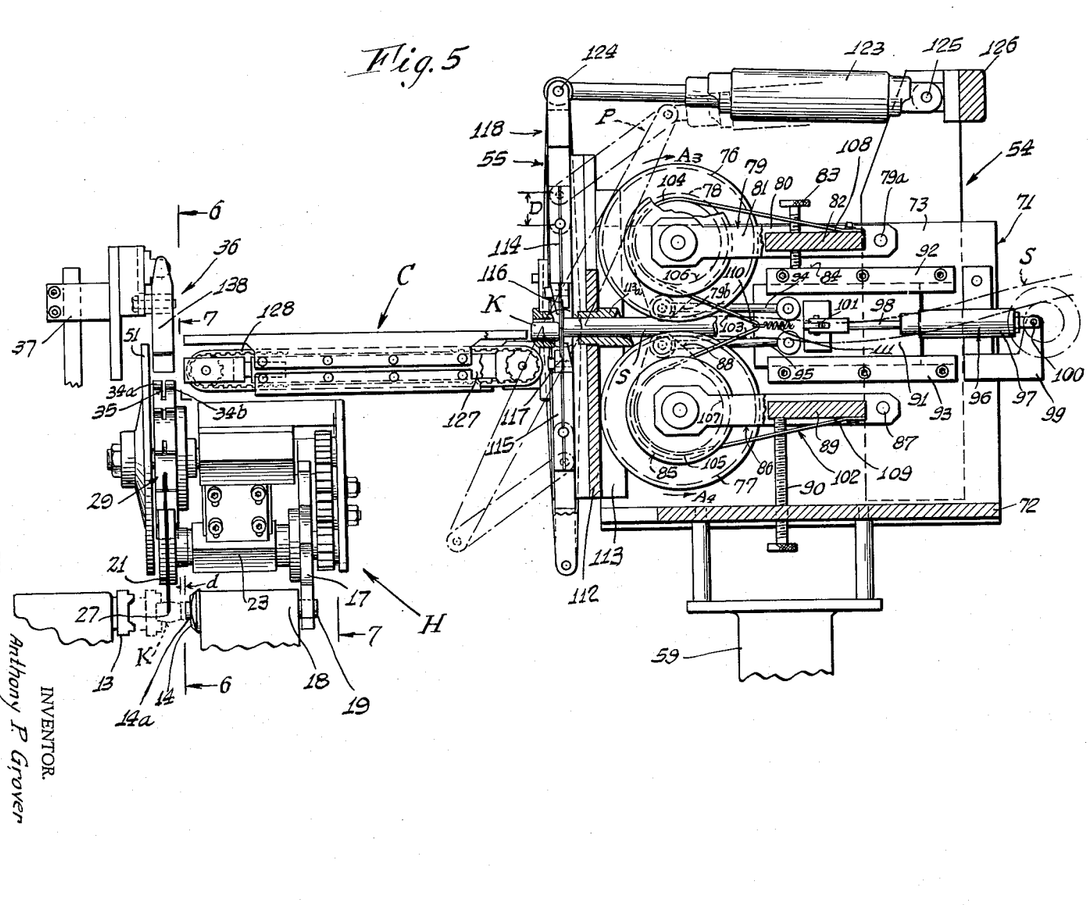
FIG. 5 is an enlarged partial side view of FIG. 2 taken on line 5—5 thereof, showing more clearly an intermediate endless belt slug conveyer delivering each slug from the strand cutting device directly to the subsequent slug handling devices of the mechanism.
Figure 9:
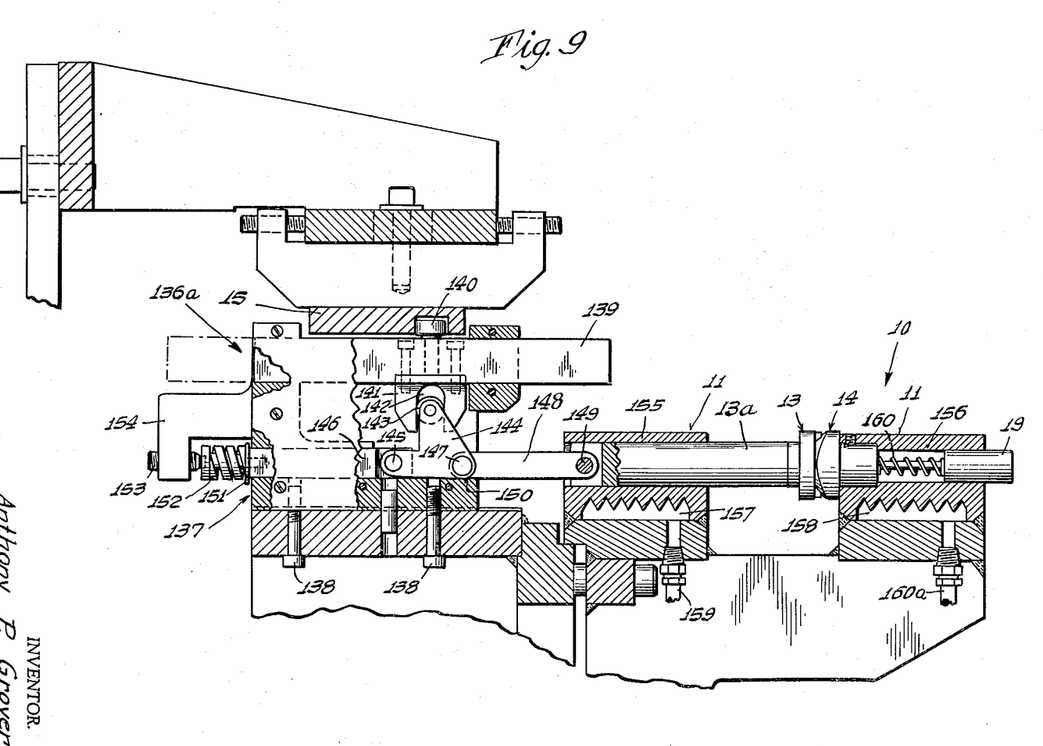
FIG. 9 is an enlarged longitudinal sectional view of one of the molding units on the carrier, illustrating a mold-actuating self-locking toggle mechanism therein.

In the die closing operation as indicated in the view of FIG. 5, the dies first advance toward each other sufficiently to receive the slug from the positioning member. Then, the die 13 is closed against the core die member 14a with the slug K confined between the dies, which closing movement pushes the die member 14a back against a fixed abutment of the molding unit 12. The closing movement is effected by a cam-controlled toggle mechanism contained in each molding unit and described below as shown in FIG. 9. Hence, the forming or molding operation of this embodiment comprises positioning a slug K between a respective pair of forming dies, then advancing the dies toward each other to engage respective ends of the slug or blank, thereupon releasing the slug from its positioning means so that now the slug is momentarily supported by the dies, and continuing the closing movement while pushing the die 14a a distance $d$ back against its abutment.

In order to accomplish this manner of operation of the forming dies 13 and 14, the molding machine is provided with a main cam track 15 (see FIGS. 1 and 9) of arcuate shape concentric with the axis of rotation of mold carrier 10 and fixed upon the base or frame of the machine. This main cam track 15 is disposed at one side of the mold carrier 10 where it will control through the toggle mechanism of FIG. 9 the movement of the associated forming dies 13. An auxiliary cam track 16 is added at the opposite side of the rotary mold carrier in accordance with provisions of this embodiment for the purpose of controlling the slug-engaging movement of the core die member 14a through the lost motion distance $d$ at the time that a slug is being positioned between the forming dies.

In the slug feeding mechanism of this embodiment in FIGS. 2 to 7, the molding units 12 receive the slugs K of molding material in controlled fashion from a slug handling unit H having drive relationship with the mold carrier 10 as through a star wheel 17 engaging the toothed rim portion of rim 18 of the mold carrier 10. The teeth of the rim 18 engaged by the star wheel 17 are represented by an endless series of pins or lugs 19 spaced equi-distantly in respect with one another along the periphery of the rim. The lugs 19 also represent cam projections serving the additional purpose of controlling various component devices of the slug feeding mechanism as will be described below. Thus the spacing of the pins 19 bears direct functional relationship to the spacing of the molding units 12 from one another. In the present embodiment the lugs 19 are identical with the cam follower members through which the auxiliary cam track 16 actuates the die members 14a.

Figures 2, 3:
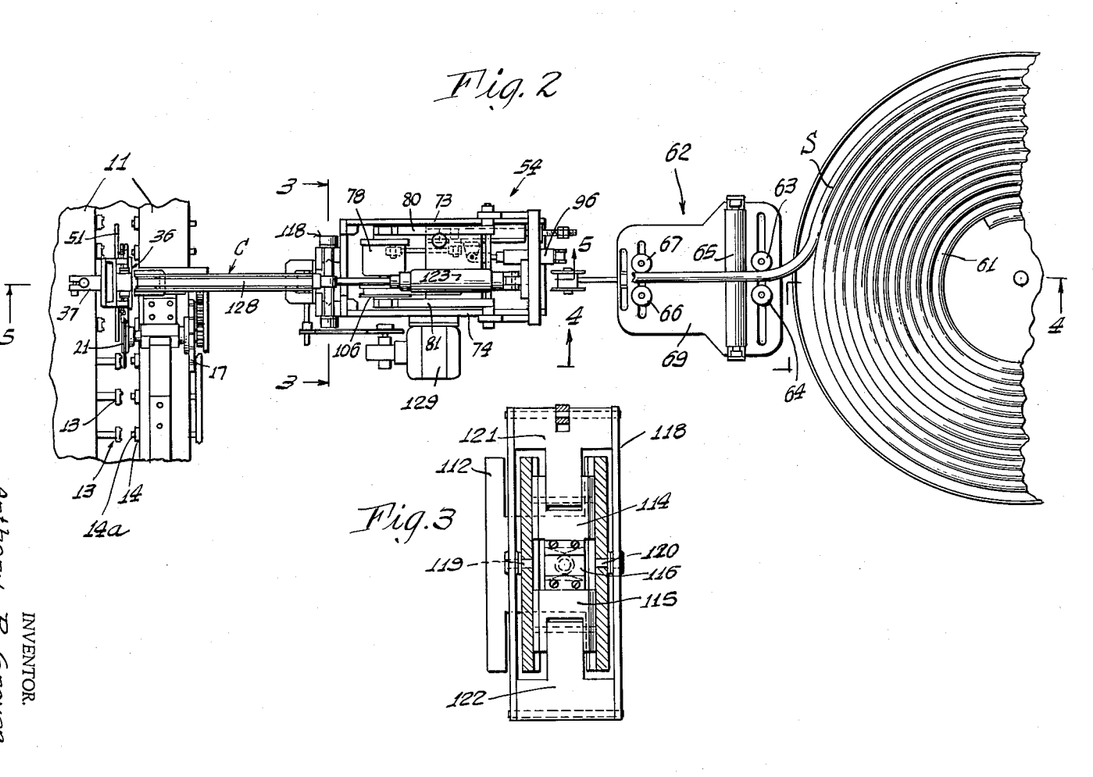
FIG. 2 is a plan view of the slug feeding mechanism wherein slugs cut from a strand pass through the strand-feeding and slug cutting devices and then through the subsequent slug handling and conveying devices to the molding units, all centrally controlled and coordinated by the rotation of the carrier.
FIG. 3 is a detailed cross-sectional view taken on line 3—3 of FIG. 2, of the slug discharge end of the slug cutting device.

The slug handling unit H is supported by an adjustable bracket structure 20 fixed relative to the base or frame of the machine. In this slug handling unit H a rotary slug positioning member is in the form of a disc 21 fixed on shaft 22 journaled in a bearing block 23 adjustably held by the aforementioned bracket structure 20. The shaft 22 is geared through the aforementioned star wheel 17 to the rotation or master movement of the mold carrier 10. The disc 21 is formed with peripheral knife edge 27 which in the operation of the mechanism by partially slicing into the slugs K picks them up and lifts them from pockets 28 of a rotary slug transfer member 29 fixed on shaft 25 also journaled in bearing block 23. Slug transfer member 29 is geared to shaft 22 by means of a train of pinions 30, 31, 32, 33, the pinions 31 and 32 being idlers also journaled in bearing block 23. Thus the train of pinions 30, 31, 32, 33 represents the timing gear arrangement between the slug positioning member 21 and the slug transfer member 29 as governed by the rate of movement of the lugs 19 of the mold carrier 10 driving the star wheel 17.

Figure 6:
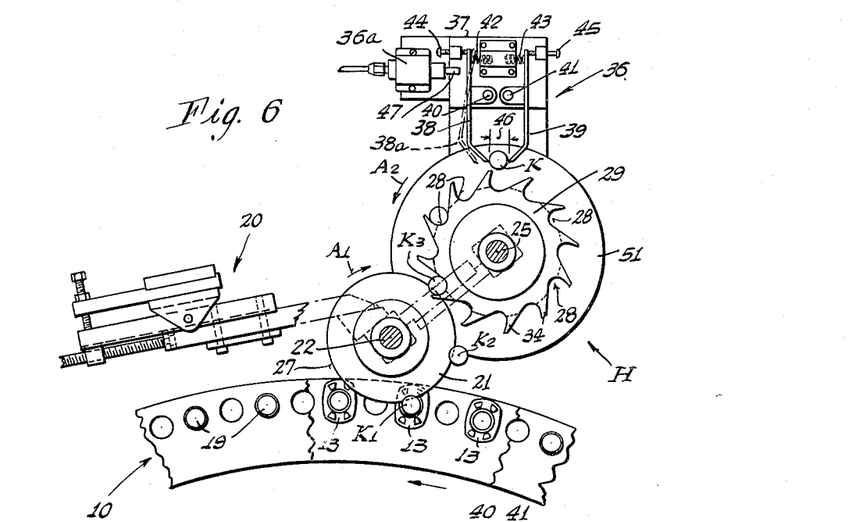
FIG. 6 is a cross-sectional view taken on line 6—6 of FIG. 5 showing a fragmentary view of the rim portion of the rotary carrier in driving connection with the slug handling devices.

The manner of positioning the slugs K in the molding units 12 is well illustrated in the view of FIG. 6 in which the disc 21 rotating in the direction of arrow $A_1$ lifts the slugs from the pockets 28 of transfer member 29 rotating in the opposite direction indicated by arrow $A_2$. The pockets in the slug transfer member 29 are formed by teeth 34 which are slitted to form prongs 34a and 34b with the recess 35 between them to accommodate the knife edge portion of disc 21. In this way the disc 21 will slice partially into the slugs K thereby frictionally holding and taking them from the respective pockets 28. As seen from FIG. 6 the spacing between the slugs held by the knife edge of the disc is equal to the spacing of the molding units 12. A slug $K_1$ held by the disc is shown positioned in a molding unit 12, while a subsequent slug $K_2$ is shown having been picked up by the knife edge due to the slicing operation, with a third slug $K_3$ still in its pocket 28 being engaged by the knife edge of the disc.

The slug handling unit H further comprises a slug detent device 36 which operates to deposit one slug K at a time upon the rotary slug transfer member 29 at intervals corresponding to those of the molding operations of the molding units 12. This detent device 36 is mounted adjustably upon a stationary bracket structure 37 mainly comprising a pair of detent fingers 38 and 39 constituting a cradle for holding a slug K ready for releasing into a respective pocket 28 below whenever the one detent finger 38 is tripped or swung in timed relation to the movement of the slug receiving pockets of the transfer member 29.

Figure 8:
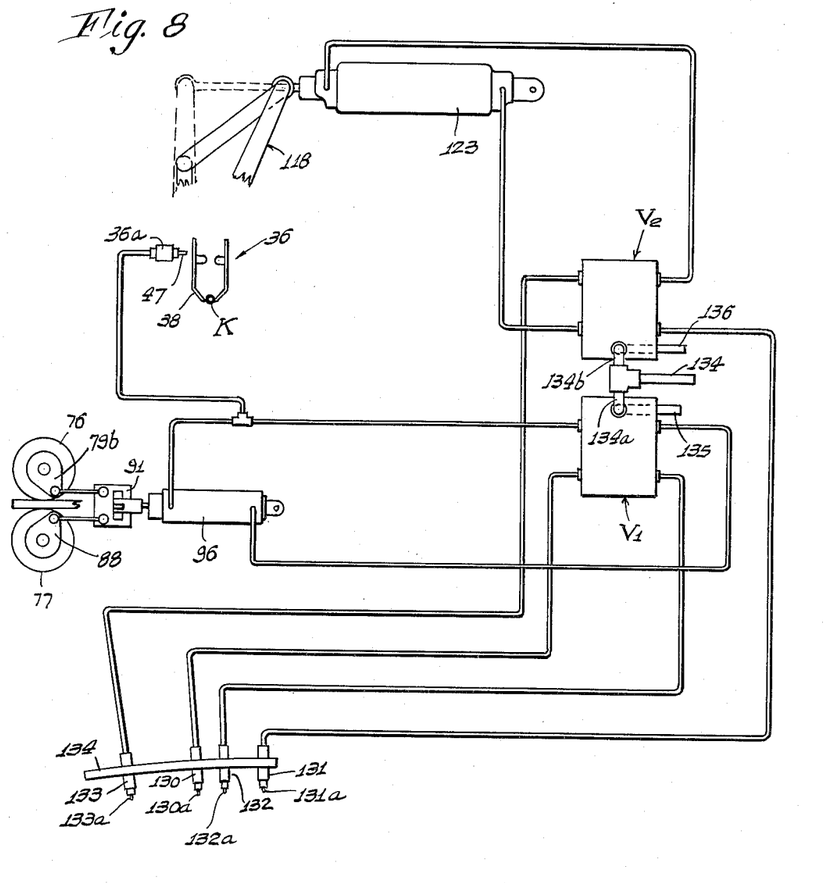
FIG. 8 is a diagrammatic view of a pneumatically actuated system centrally controlled by the rotation of the carrier for operating the power cylinders of various component devices of the mechanism.

The detent fingers 38 and 39 are pivotally mounted at 40 and at 41 upon the bracket structure 37, each of the detent fingers being urged into slug holding position as by springs 42 and 43 respectively with adjustable stops 44 and 45 determining the operating gap 46 between the lower end tips of the detent fingers. The gap 46 is small enough to retain the slug cradled between the fingers but will release the slug when finger 38 is rocked or tripped as indicated by the dot-and-dash position 38a thereof. The finger 38 is thus actuated at the proper moment to release the slug by means of an actuating pusher pin 47 momentarily rocking the detent finger 38. The actuating pusher pin 47 receives its impulse in timed relation to each molding operation from a pneumatic operating device 36a included in the system more fully described below and diagrammatically shown in FIG. 8.

After the release of a slug the detent device 36 receives a new slug carried to it by a conveyor unit C, having an endless conveyor band driven continuously by a motor. The conveyor band will carry a slug to the detent device 36 depositing it between the detent fingers 38 and 39 thereof, with the proper position of the slug between the fingers assured by a stop or abutment disc 51 rotating unitary with the slug transfer member 29.

The conveyor unit C is carried by and extends in cantilever fashion horizontally from a frame structure that houses a strand feeding mechanism 54 and an associated slug cutting device 55. A series of slugs K is cut continuously from a strand S of molding material being fed in step-wise fashion to the cutting device by a strand feeding mechanism 54. The slug cutting operations are timed to the operation of the slug handling unit H, to correspond to the intervals of the molding operations of the sequential molding units 12 incident to the rotation of the mold carrier 10 of the machine.

The strand feeding mechanism 54 operates to impart step-wise advance of the strand S toward the slug cutting device 55, both the feeding mechanism 54 and the cutting device 55 being mounted unitary upon a frame structure carried by a stand or column 59 having fixed relationship with the frame of the molding machine.

Figures 4, 10, 11:
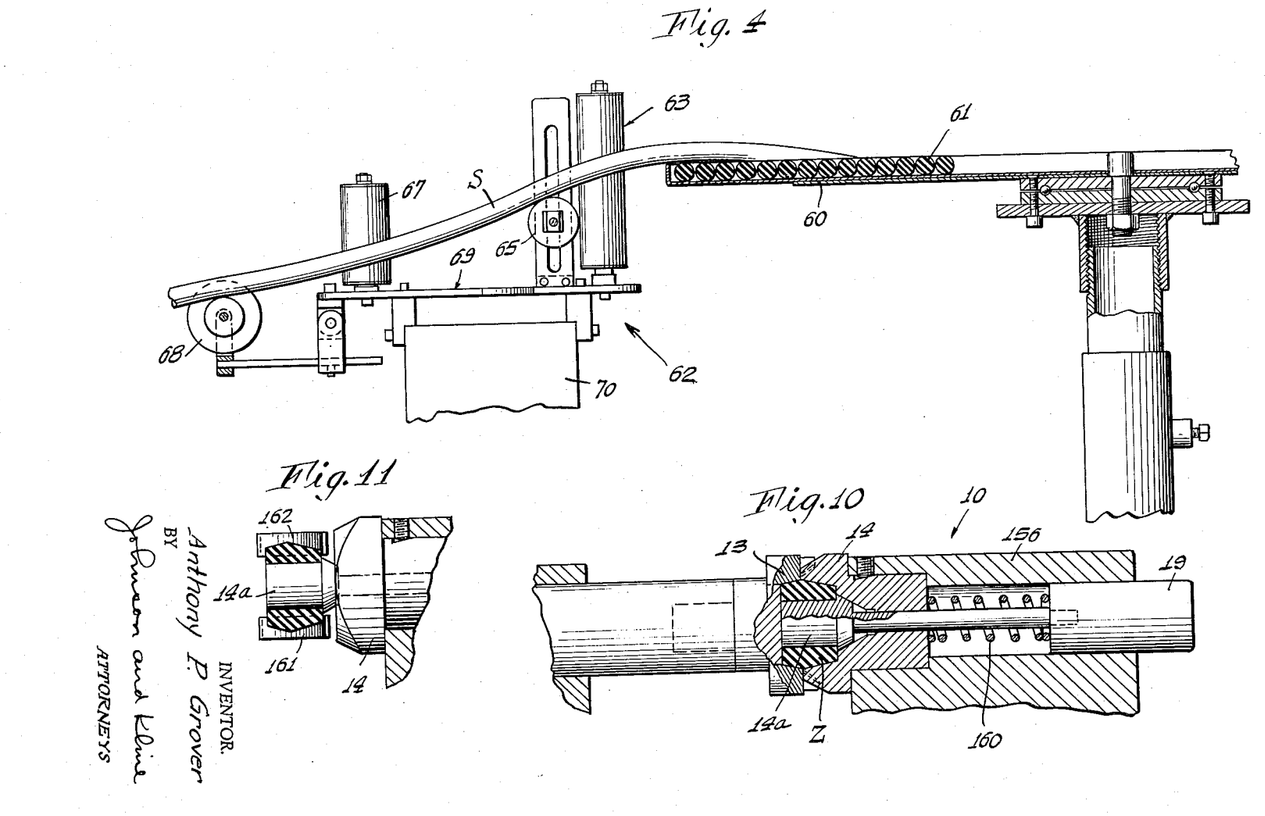
FIG. 4 is a view of FIG. 2 taken on line 4—4 showing a side view of a strand supply station with strand guiding means leading the strand to the slug cutting device.
FIG. 10 is a greatly enlarged detail view of an example of a pair of molding dies for producing a cylindrical molded article from a slug, additionally providing a core die member and means for actuating the same.
FIG. 11 illustrates the stripping of the article from the core die member shown in FIG. 10.

The strand S derives from a rotary supply table or tray 60 upon which the strand is formed in a flat spiral coil 61 with the strand leading off the periphery of the coil and by way of a strand guiding device 62 to the strand feeding mechanism 54. The strand passing through the guiding device 62 has its path defined by a first pair of vertical guide rollers 63 and 64, a first horizontal supporting guide roller 65, a second pair of vertical guide rollers 66 and 67 and a second horizontal supporting guide roller 68, all the guide rollers vertical as well as horizontal being universally adjustable upon a bracket structure 69 mounted upon a post or column 70.

In the strand feeding mechanism 54, a frame structure 71 has a bottom portion 72, a pair of side wall portions 73 and 74, and a supporting stand or column 59 fastened to the bottom portion 72. A pair of feed rollers 76 and 77 effects the step-wise advancement of the strand S by frictional engagement therewith. The upper feed rollers 76 together with a one-way coaxial drive unit or clutch 78 is carried by the free end of a swingable frame 79 having its opposite end journaled as at 79a in the wall portions 73 and 74 of the frame structure. The one-way drive unit 78 has an actuating arm 79b which if oscillated will impart correspondingly intermittent rotation to the feed roller 76 in the direction of arrow $A_3$. The swingable frame 79 has a pair of side members 80 and 81 and a transverse member 82 rigidly interconnecting the side members 80 and 81. A stop screw 83 in the transverse member 82 is adjustable to define the position of the upper feed roller 76 relative to the lower feed roller 77 as well as relatively to the strand S between the rollers, the stop screw 83 setting against an abutment 84 upon the wall portion 73.

Similarly, the lower feed roller 77 together with a one-way coaxial drive unit or clutch 85, is carried by the free end of a swingable frame 86 the opposite end of which is journaled as at 87 upon the wall portions 73 and 74 of the frame structure. The clutch 85 has an actuating arm 88 which if oscillated will impart correspondingly intermittent rotation to the lower feed roller 77 in the direction of arrow $A_4$. The swingable frame 86 has a transverse member 89 serving as abutment for an inverted stop screw 90 adjustable in the bottom 72 of the frame structure.

Means for imparting simultaneous intermittent rotation to the feed rollers 76 and 77 comprise a reciprocable actuator plate 91 slidable in a pair of horizontal guides 92 and 93 upon the wall portion 73 towards and away from the feed rollers, with a pair of identical and symmetrically disposed actuator links 94 and 95 interconnecting the plate with respective actuator arms 79b and 88 of the one-way clutch devices 78 and 85. A pneumatically operated power cylinder unit 96 having a swingable cylinder 97 and a piston rod 98 reciprocates the plate 91 to effect step-wise advance of the strand S towards the cutting device, the power cylinder being swingably mounted upon a bracket 99 by a pivot connection 100, the piston 98 being pivotally connected at 101 to the plate. In this way, each time the piston rod 98 is extended, the strand will thereby be advanced the predetermined distance of the length of a slug to be cut from the strand. Idle return of the piston rod will leave the feed rollers at rest due to the function of the one-way drive units 78 and 85, with a brake device 102 acting automatically to hold the feed rollers fixed and steady in the position attained at the end of the strand advancing stroke of the plate. This operation of cylinder unit 96 to advance the strand is controlled by the pneumatic operating system shown in FIG. 8 governed by the master movement or rotation of the rotary mold carrier 10, to be described below.

The brake device 102 in the preferred example shown is extremely simple, compact and inexpensive to install requiring merely a single brake band 103 forming a pair of symmetrical loop portions 104 and 105 each engaging a brake drum 106 and 107 respectively of the feed rollers 76 and 77. In this embodiment, with the band engaging about half of the circumference of each respective drum, the outer ends 108 and 109 of the brake band are anchored and fastened to the respective transverse members 82 and 89 respectively of the swingable frames 79 and 86, whereas the intermediate V-shaped or vortex portion 110 of the band is subject to the tension of a spring 111 anchored in any suitable manner upon the frame structure 71. When so arranged the brake band during the strand feeding stroke of the plate will tend to loosen its frictional engagement with the drums incident to the yielding or stretch of spring 111, so that the drums will slip relative to the band. However, the idle return stroke of the plate 91 will allow the spring 111 to tighten the band into frictional engagement with the drums effective to hold the feed rollers and the strand in their position at the end of each step-wise advance of the strand.

The slug cutting device 55 is mounted upon the wall 73 of the frame structure 71 at the strand emerging side of the feed rollers 76 and 77, by means of a vertical bracket structure 112, having a vertical flange 113 fastened or bolted to the wall 73 and also having a guide sleeve or guide eye 113a through which the strand is guided to the adjacent subsequent cutting device 55. The bracket structure 112 carries a pair of vertical knife guides 114 and 115 in which operate a pair of slug cutting knives 116 and 117 slidable vertically in a counter current movement towards and away with respect to one another. The knives are actuated by a vertical swingable rectangular frame 118 surrounding the vertical knife guides 114 and 115 and carried thereby through a pair of trunnion bearings 119 and 120 with a trunning axis intersecting at right angles with the axis of the strand emerging from the guide eye 113a. An upper actuating link 121 operatively connects the top end of the swingable frame 118 with the upper knife 116, whereas a lower link member 122 operatively connects the lower end of the swingable frame with the lower knife 117. A pneumatic power cylinder unit 123 has its piston rod pivotally connected as at 124 to the upper end of the swingable frame 118, the cylinder itself having pivotal connection 125 with a bracket 126 carried by the frame structure 71. Retraction of the piston rod of this power cylinder causes movements of the parts to the dot-and-dash line position P and withdrawal of the knives away from each other to clear passage for the strand S to be advanced, whereby each knife will have been retracted a distance D. Each step-wise advance of the strand pushes a previously cut slug onto a conveyer unit C whereupon the knife-actuating members are moved to the full line position of FIG. 5 bringing the knives toward each other attaining between them the overlap shown in FIG. 5 incident to the cut-off of a slug K from the strand.

The conveyer unit C has a horizontal frame 127 having its slug receiving end fastened to the vertical bracket structure 112 so that the conveyor unit extends in cantilever fashion horizontally away from the cutting device, to terminate adjacent to the slug detent device 36. The conveyer unit C has an endless conveyer band 128 driven continuously by a motor 129 so that a slug received by the conveyer from the cutting device with each advancement of the strand is immediately brought to the detent device 36, and received by the detent fingers 38 and 39 as the slug is propelled by the conveyer band against the abutment or stop disc 51.

The functions of the various component devices of the slug feeding mechanism of this invention are centrally controlled and coordinated from the rotary mold carrier 10. This control and coordination is effected by the action of the cam projections 19 on the carrier, being effective simultaneously to drive the operating elements of the slug handling unit H and to actuate the pneumatic power cylinders through the operation of the pneumatic actuating system of FIG. 8.

This pneumatic system provides a stationary set of four pilot relief valves 130, 131, 132 and 133 mounted side by side upon a stationary bracket 134 along the periphery of the rotary mold carrier 10 (see FIGS 7 and 9), the pilot valves each having a depressible actuating pin 130a, 131a, 132a and 133a respectively. These valves are so spaced from one another that the depressible valve actuating pins will be engaged by the successive cam projections or lugs 19 in such a manner that each time a molding operation is performed the action of the respective relief pilot valves will cause through this system and operating device 36a a slug to be released upon the detent device 36 to the slug handling unit H, while another slug is placed on the conveyer C for delivering to the now empty detent device due to the slug feeding device being actuated to push a residual slug from the cutting device onto the conveyer. This is followed by the severing from the strand S of a fresh slug K by the actuation of the cutting knives.

The aforementioned pilot relief valves which actuate a pair of master control valves $V_1$ and $V_2$ control the supply of air pressure to either the one or other side of the pistons of the pneumatic power cylinder units to effect extension or retraction respectively of the piston rods. With such controls when air pressure is admitted to one side of the piston to extend the piston rod, the other side is connected to exhaust. Conversely when retracting the piston rod, the air pressure and exhaust connections are reversed.

Figure 7:
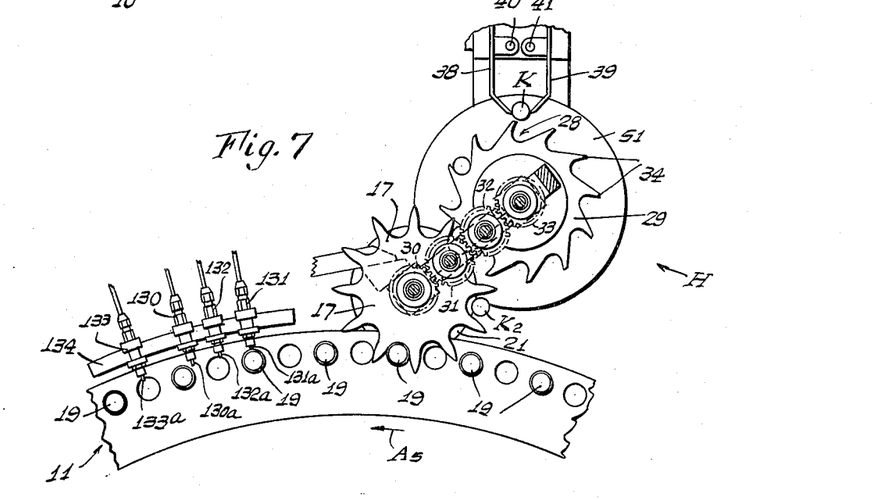
FIG. 7 is a cross-sectional view taken on line 7—7 of FIG. 5, showing a timing gear arrangement for the slug handling devices controlled by the rotation of the carrier.

Referring to FIGS. 7 and 9, the actuating system according to this invention is combined with a continuous molding machine and is controlled by the master movement or rotation of the mold carrier 10. With the mold carrier 10 rotating in the direction of arrow $A_5$, first the pilot valve 130 has its actuating pin 130a depressed to influence the master control valve unit $V_1$ to apply air pressure to the power cylinder unit 96 moving the plate 91 to advance the strand S a predetermined step. At the same time the pusher finger 47 of the slug detent device 36 retracts as the operating cylinder 36a thereof exhausts together with the exhaust from cylinder 96, allowing the detent finger 38 to return to slug catching and detaining position. Next (the actuating pin 131a of pilot valve 131 is engaged and depressed by a cam projection 19 bringing about through the action of master control valve unit $V_2$ the extension of the piston rod of power cylinder 123 swinging the frame 118 from its dot-and-dash line position to full-line position in FIG. 5 thereby moving the knives towards each other cutting a slug K from strand S.

Next, the actuating pin 132a of pilot valve 132 is depressed by a cam projection 19 influencing the master control valve unit $V_1$ to retract the piston rod of power cylinder 96 thereby returning the plate 91 leaving the strand stationary in the position which it attained at the end of its previous advance. The same pneumatic impulse from master control valve $V_1$ extends the pusher pin 47 actuating finger 38 to release a slug into a respective pocket 28 of slug transfer member 29. Finally, a cam projection 19 depresses actuating pin 133a of pilot valve 133 causing master valve $V_2$ to retract the piston rod of power cylinder 123 which effects the movement of the knives away from each other to clear passage for the next following advance of strand S towards the cutting device.

In the operation of the pneumatic actuating system compressed air is supplied to the master control valve units $V_1$ and $V_2$ through a common compressed air supply connection 134 having branches 134a and 134b leading to the valve units $V_1$ and $V_2$ respectively. Each of these valve units has an exhaust air discharge connection 135 and 136 respectively.

The manner in which the die member 13 of each molding unit 12 is actuated by the stationary cam member or cam track 15 of the machine is more clearly illustrated in the enlarger FIG. 9, especially showing a toggle mechanism effective to advance and then lock the die member 13 in die-closing position.

Accordingly, each molding unit has an operating section 136a comprising a separate subframe or housing 137 secured as by bolts 138 to the rim portion 11 of the mold carrier 10. A slide bar 139 is mounted in the upper portion of the housing, carrying a cam follower or cam roller 140 engaged by the stationary cam track 15 of the machine. The slide bar 139 has unitary therewith a forked portion or block 141 formed with a slot 142 in which operates a roller 143 carried by a bell crank 144. A pin 145 operatively connects the bell crank with a thrust rod 146 also slidable in the housing parallel to the slide bar 139. The bell crank 144 has pivotal connection 147 with a link 148 which in turn has pivotal connection 149 with plunger 13a that holds the die member 13. When the cam track through cam roller 140 moves the slide bar 139 from the dot-and-dash line position to the right, the die member 13 is thereby advanced to closing position whereby pivotal connections 145, 147, 149 between thrust bar 146 and die member 13 are brought into alignment and locked due to the intermediate pivot connection 147 having moved slightly past dead center and against an abutment face 150.

In this die closing position the toggle is self-locked and will remain so without the cam roller 140 engaging cam track 15, so that the load of keeping the dies closed need not be sustained by the cam track having to continue work and friction imposed thereon. To unlock the die member 13, the cam roller 140 is engaged by the cam track in the opposite direction returning the slide bar 139 to its dot-and-dash line position while swinging the bell crank to unlock the toggle mechanism. The thrust rod 146 is formed at its outer end with a head 151 to limit the inward movements of the rod. A compression coil spring 152 is confined between the head 151 and an adjusting screw 153 threaded into an extension 154 of housing 137.

The spring 152 allows the die member 13 to yield when in cavity closing locked position, to allow for instance for the expansion of the material contained in the cavity. The spring also allows for the slight recession of the pivotal connection 145 of the bell crank as the intermediate pivotal connection 147 passes dead center.

The die members or molding dies 13 and 14 operate in rings 155 and 156 respectively surrounding the rim portion of the rotary mold carrier 10. The rings together with the rim portion form heating chambers 157 and 158 for the respective molding dies, having pipe connections 159 and 160a to a swivel connection for steam or other temperature controlling fluid to effect semi-curing of the material in the cavities while the molding units move to the point of discharge where the article is released from the molds down the chute U to the finish curing station V.

The detail showing in FIG. 10 illustrates the manner in which, for example, an article Z of thick walled cylindrical shape is produced from a suitably shaped slug of the molding material. With a slug K positioned by the feed mechanism between the die member 13 and the core die member 14a, the die members are moved towards each other by the respective stationary cam track members 15 and 16 of the machine to grip the slug between them so that it can be released from the positioning member 21. The further rotation of the mold carrier 10 relative to the cam track members then causes the toggle mechanism of FIG. 9 to advance the die member 13 while the core member 14a is retracted into the cavity of die member 14 by the action of a confined compression spring 160. The continued actuation of the toggle mechanism by the cam track fully closes the molding dies as shown in FIGS. 9 and 10 thereby forcing the material to fill the cavity around the core member 14a thus forming the cylindrical article Z of FIG. 10. When the article is to be released from the molding units the die member 13 is retracted sufficiently to be separated from and clear of the article still seated the die member 14. The core member 14a in turn is then advanced by the action of suitable cam means on the machine to separate the article from its seat in the die member 14. With continued movement of the molding units along their path a pair of stationary stripper rails 161 and 162 (see FIG. 11) become effective to engage the rear face of the article in a manner to strip the same from the core member 14a as the core member in turn is allowed to be retracted into the cavity of molding die 14.

Variations and modifications may be made within the scope of the claims and portions of the improvements may be used without others.

I claim:

1. A continuous molding machine comprising a rotary mold carrier having cam projections equispaced along its rim and a series of molding units moving in an endless path, each of said units providing a pair of coaxial complementary molding dies to receive a slug of molding material and operable to be closed and opened to form a molded article, a slug feeding mechanism for said molding units comprising slug positioning means operatively associated with said carrier and effective to position and hold a slug between each pair of molding dies until engaged by the dies and adapted to release the slug when so engaged, actuating means associated with the carrier to close the dies upon each other and upon the slug coincident with advancement of the molding units along said path, a strand cutting device, a strand feeding mechanism operating in timed relation with said cutting device to effect stepwise feeding of a strand of molding material to the cutting device for cutting therefrom a series of slugs of predetermined length at intervals corresponding to those between successive forming operations of the molding dies, and means for conveying each slug from the cutting device to and onto the slug positioning means one at a time for each molding operation of the molding dies, and a pneumatic actuating system having pneumatic actuating cylinders operatively connected respectively with said slug cutting device and with said strand feeding mechanism with master control valve means to operate the cylinders, and stationary pilot air valve means having depressible operating pins adapted to be engaged by said cam projections to operate said cutting device and said feeding mechanism in timed relationship to one another by said pilot means influencing said master control valve means to actuate the cylinders.

2. A continuous molding machine comprising a rotary mold carrier having a series of molding units along its periphery moving in an endless path, each molding unit providing a pair of coaxial complementary molding dies to receive a slug of molding material and operable to open and to close to form a molded article, a mechanism for feeding an elongate cylindrical slug comprising a rotary slug positioning member shaped to penetrate the body of a slug substantially midway between the ends thereof to carry a succession of slugs to the molding units and rotated by the carrier at a ratio whereby positioning is effected of each slug between the dies of a respective molding unit and the slugs are detached radially therefrom, an actuating means effective to initially close the dies to engage the slug until detached from the positioning member and effective to fully close said dies upon each other and upon the slug coincident with progress of the molding units along said path.

3. The molding machine according to claim 2, in which the rotary slug positioning member is in the form of a disc having a peripehral knife edge portion adapted to partially cut into the slugs to have them releasably attached to the disc, said slugs adapted to become detached when initially held by said dies.

4. The molding machine according to claim 2, in which said slug positioning member is formed with a peripheral knife edge, with the addition of a rotary slug transfer member formed with teeth so contoured as to form pockets along the periphery adapted to carry therein a sequence of said slugs and cooperatively coupled to the rotation of said positioning member, said teeth being slotted each to form a pair of prongs separated by a recess, with said knife edge portion passing through consecutive recesses incident to the rotation of the positioning member counter-current to the rotation of the slug transfer member, and thereby adapted to partially slice into and thus frictionally hold and carry the slugs from the consecutive pockets of the transfer member to the molding units.

5. The molding machine according to claim 2, with the addition of a rotary slug transfer member formed with pockets along its periphery adapted to carry therein a sequence of said slugs and cooperatively coupled to the rotation of said positioning member effective to take the slugs sequentially from said pockets for positioning between said dies, and a slug detent device having a slug detent member operable to release a slug into a respective pocket for each molding operation of the molding units.

6. The molding machine according to claim 2, with the addition of a rotary slug transfer member formed with pockets along its periphery adapted to carry therein a sequence of said slugs and cooperatively coupled to the rotation of said positioning member effective to take the slugs sequentialy from said pockets for positioning in the molding units, a slug detent device having a slug detent member operable to release a slug at a time into a pocket for each operation of the molding units, conveyer means for propelling a slug into engagement with said slug detent member, and a slug abutment disc coaxially rotating with said slug transfer member and having an edge portion extending into cooperative relationship with the detent device to provide an abutment face receiving said slugs being consecutively propelled there against by said conveyer means.

7. A continuous molding machine comprising a mold carrier having a series of molding units moving in an endless path, each providing a pair of coaxial complementary molding dies to receive a slug of molding material and operable to be closed and opened to form a molded article; a slug feeding mechanism for said molding units comprising slug positioning means operatively associated with said carrier and effective to penetrate, position and hold a slug between each pair of molding dies until engaged by the dies and adapted to automatically release the slug when so engaged, and a slug transfer mechanism separate from said slug positioning means and carrying a sequence of said slugs in timed relationship with said positioning means and effective to apply said slugs to the positioning means one at a time for each operation of the molding dies; and actuating means associated with the carrier to close the dies upon each other and upon the slug coincident with the advancement of the molding units along said path.

8. A continuous molding machine comprising a mold carrier having a series of molding units moving in an endless path, each providing a pair of coaxial complementary molding dies to receive a slug of molding material and operable to be closed and opened to form a molded article; a slug feeding mechanism for said molding units comprising slug positioning means operatively associated with said carrier and effective to penetrate, position and hold a slug between each pair of molding dies until engaged by the dies and adapted to automatically release the slug when so engaged, a slug transfer mechanism conveying a sequence of said slugs in timed relationship with said slug positioning means and effective to apply the slugs to said positioning means, and a slug detent device actuated in timed relationship with said slug transfer mechanism to deposit one slug at a time upon the transfer mechanism for each molding operation by the molding dies; and actuating means associated with the carrier to close the dies upon each other and upon the slug coincident with the advancement of the molding units along said path.

9. A continuous molding machine comprising a mold carrier having a series of molding units moving in an endless path, each of said units providing a pair of coaxial complementary molding dies to receive a slug of molding material and operable to be closed and opened to form a molded article, means for heating said molding dies, a slug feeding mechanism for said molding units comprising slug positioning means operatively associated with said carrier and effective to penetrate, position and hold a slug between each pair of molding dies until engaged by the dies and adapted to automatically release the slug when so engaged, a device for cutting a strand of moldable material, said device being independent of and remote from said positioning means, a strand feeding mechanism operated in timed relation with said cutting device to effect step-by-step feeding of a strand to the cutting device for cutting therefrom a series of slugs of predetermined length at timed intervals corresponding to those between successive forming operations of the molding dies, a strand supply means containing a coil supply of the strand, and actuating means associated with the carrier to close the dies upon each other and upon the slug coincident with the advancement of the molding units along said path.

References Cited in the file of this patent
UNITED STATES PATENTS

| | | |
|---|---|---|
| 405,631 | Wallace | June 18, 1889 |
| 466,145 | Aregood et al. | Dec. 29, 1891 |
| 1,030,513 | Gallison | June 25, 1912 |
| 1,257,960 | Reich | Feb. 26, 1918 |
| 1,597,803 | Kearney et al. | Aug. 31, 1926 |
| 2,027,915 | Kux | Jan. 14, 1936 |
| 2,044,961 | Waner | June 23, 1936 |
| 2,166,490 | Gora | July 18, 1939 |
| 2,402,462 | Sullivan | June 18, 1946 |
| 2,471,139 | Benander et al. | May 24, 1949 |
| 2,479,959 | O'Niel | Aug. 23, 1949 |
| 2,607,074 | Slaughter | Aug. 19, 1952 |
| 2,695,569 | Spohr | Nov. 30, 1954 |
| 2,699,574 | Gilbert | Jan. 18, 1955 |
| 2,713,697 | Willcox | July 26, 1955 |
| 2,864,123 | Gora | Dec. 16, 1958 |
| 2,881,475 | Wilckens | Apr. 14, 1959 |